Jan. 12, 1937.  F. R. ERICSON ET AL  2,067,834
PARALLEL FLOW TURBINE ARRANGEMENT
Filed Oct. 4, 1935
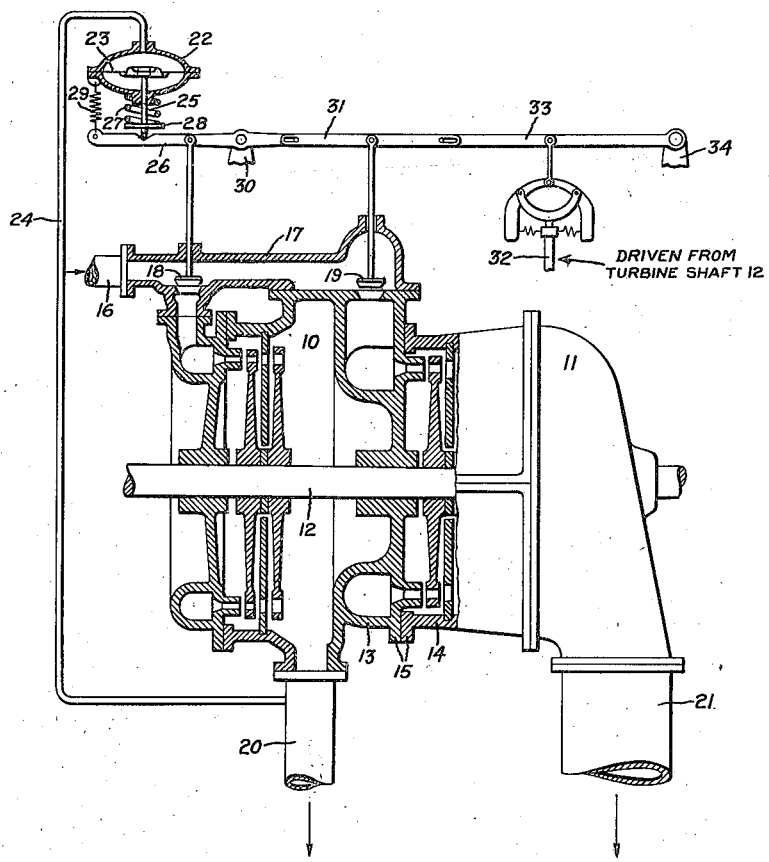
Inventors:
Franklin R. Ericson,
Arthur D. Somes,
by Harry E. Dunham
Their Attorney Patented Jan. 12, 1937

2,067,834

UNITED STATES PATENT OFFICE 2,067,834

PARALLEL FLOW TURBINE ARRANGEMENT

Franklin R. Ericson and Arthur D. Somes, Marblehead, Mass., assignors to General Electric Company, a corporation of New York Application October 4, 1935, Serial No. 43,536

3 Claims. (Cl. 60—67)

The present invention relates to parallel flow turbine arrangements which include at least two elastic fluid turbines or turbine parts having shafts mechanically coupled and provided with inlets for receiving elastic fluid in parallel. More specifically, the invention relates to the type of turbine arrangements in which one of the turbines is a condensing turbine and the other a noncondensing turbine, the exhaust from the noncondensing turbine being used for industrial purposes. In many cases, the exhaust pressure or like condition of the exhaust fluid of the noncondensing turbine must be maintained substantially constant. This necessitates the provision of special regulating means whereby during normal operating conditions both changes in mechanical load demand from both turbines or turbine parts and changes in the demand for exhaust fluid from the noncondensing turbine can be satisfied.

The object of my invention is to provide an improved construction and arrangement of parallel flow turbine arrangements of the type above specified and regulating means for controlling such turbines whereby the supply of elastic fluid to the turbines is controlled in response to changes in demand for exhaust fluid from the noncondensing turbine and in response to changes in demand for mechanical load output so that a change in demand mechanical load output is normally satisfied without disturbing the condition of the extraction fluid and vice versa.

For a consideration of what we believe to be novel and our invention, attention is directed to the following description and the claims appended thereto, in connection with the accompanying drawing. The drawing illustrates somewhat diagrammatically and partly in section a parallel flow turbine arrangement in accordance with our invention.

The arrangement comprises two turbines or turbine parts, a noncondensing turbine 10 and a condensing turbine 11. The rotors of the two turbines are mechanically connected. In the present instance, the two turbines are provided with a single shaft 12 and also have a single casing comprising two portions, a portion 13 and a portion 14 held together by flanges 15. Elastic fluid is conducted to the two turbines in parallel through a conduit 16 connected to a common valve chest 17. The flow of elastic fluid to the two turbines is controlled by means of a first valve 18 for the noncondensing turbine 10 and a second valve 19 for the condensing turbine 11. The noncondensing turbine 10 exhausts into a conduit 20, from which the exhaust fluid is conducted to an industrial plant or apparatus, not shown, at substantially constant pressure. The pressure in the conduit 20 must be maintained substantially constant, that is, within the regulation characteristics of a governor at varying flow of elastic fluid therethrough. The condensing turbine 11 discharges or exhausts through a conduit 21 to a condenser (not shown) or to atmosphere. The rotors of the two turbines, 10 being mechanically coupled, furnish a common mechanical load output. In accordance with our invention, a control or governing mechanism is provided for controlling the valves 18 and 19 normally to satisfy both varying demands for mechanical load output and varying demands for exhaust steam from the noncondensing turbine 11. The control mechanism comprises means for controlling the valves 18 and 19 in response to changes of a condition of the fluid in the exhaust conduit 20 of the noncondensing turbine and other means for controlling the valves 18 and 19 in response to changes in demand for mechanical load output. The first means for controlling the valves in response to changes in the condition of the elastic fluid exhausted from the noncondensing turbine 10 has been shown in the present instance as comprising a pressure responsive device having a casing 22 with a diaphragm 23 forming an upper space and a lower space in the casing. The upper space is connected by a pipe 24 to the conduit 20 of the noncondensing turbine. The diaphragm 23 is loosely connected by a link 25 to an intermediate point of a first lever 26. The diaphragm is loaded by a loading spring 27 surrounding the link 25 and held between the lower portion of the casing 22 and an abutment 28 fastened to the link 25. An increase in pressure in the conduit 20 causes a corresponding increase in pressure in the upper half of the casing 22 whereby the diaphragm is forced downward and effects downward movement of the link 25; and vice versa, a drop in pressure in the conduit 20 of the noncondensing turbine effects upward movement of the link 25. The left-hand end of the lever 26 is biased upward by a biasing spring 29 connected to one end of the lever and to the casing 22 to hold it in contact with link 25. The lever 26 is supported on a fulcrum 30 and at another point intermediate the fulcrum 30 and the connection with the link 25, said lever is pivotally connected to the valve 18. The right-hand end of the lever 26 is pivotally connected to a floating link or second lever 31 which has an intermediate point pivotally secured to the valve 19.

The mechanism so far described serves to control the parallel flow of turbine or turbines in response to variations in demand for exhaust from the noncondensing turbine 10 and to maintain the mechanical load output constant during variations in steam demand from the noncondensing turbine 10. The right-hand end of the floating lever 31 remains fixed during regulations in response to a change in condition of elastic fluid in the conduit 20. More specifically, the operation with respect to varying conditions of elastic fluid in the conduit 20 is as follows: A decrease in fluid pressure in the conduit 20, which may be due to an increase in demand for elastic fluid from the exhaust of the noncondensing turbine 10, effects, as pointed out above, upward movement of the link 25 of the pressure responsive device 22. This effects clockwise turning movement of the lever 26 about the fulcrum 30, resulting in opening movement of the valve 18 and downward movement of the left-hand end of the lever 31, resulting in closing movement of the second valve 19 for the condensing turbine 11. This movement continues until the desired pressure is established in the conduit 20. Opening of the valve 18 obviously causes an increased flow of elastic fluid through the noncondensing turbine 10, which in turn effects an increase in mechanical load output thereof. This increase in mechanical load output, however, is balanced by a corresponding decrease in mechanical load output of the condensing turbine 11 due to the closing movement of the valve 19 effected simultaneously with the opening movement of the valve 18. The operation of the mechanism in response to an increase in pressure in the conduit 20 is similar but with different elements moving in the opposite direction; that is, an increase in pressure in conduit 20, due to a decrease in demand for exhaust elastic fluid from the noncondensing turbine, causes closing movement of the valve 18 and opening movement of the valve 19. It will be readily understood that the change in pressure or like condition of elastic fluid discharged through the conduit 20 from the noncondensing turbine 10 always effects movement of both valves 18 and 19, and that the movements of these valves under such conditions always takes place in opposite directions.

The means for controlling the parallel flow turbine arrangement in response to a change in demand for mechanical load output comprises a speed governor or speed responsive device 32 driven from the turbine shaft 12 and pivotally connected to a lever 33 which has a right-hand end connected to a fulcrum 34 and a left-hand end pivotally connected to the right-hand end of the floating link or second lever 31. The speed governing mechanism also includes the levers 31 and 26 of the pressure governor. The operation of the mechanism response to changes in demand for load output is as follows: A decrease in demand for mechanical load output causes an increase in turbine speed whereby the flyweights of the speed governor 32 are moved outward by centrifugal force and thus effect downward turning movement of the lever 33. This downward turning movement causes downward movement of the right-hand end of the floating lever 31, the left-hand end of the lever 31 remaining fixed, resulting in closing movement of the valve 19 and decrease in flow of elastic fluid to the condensing turbine 11. Decrease in flow of the condensing turbine 11 results in decrease of the mechanical load output and in a drop in speed. Similarly, an increase in demand for mechanical load output causes a decrease in speed, whereby the flyweights of the speed governor 32 are moved inward and effect upward movement of the lever 33, resulting in upward movement of the right-hand end of the floating lever 31 and opening movement of the valve 19 of the condensing turbine 11. In both of the aforementioned conditions of operation, only the control valve 19 for the condensing turbine had been moved or adjusted while the control valve 18 for the noncondensing turbine remained stationary, thus maintaining constant the flow of fluid through the condensing turbine and accordingly the condition of the fluid in the conduit 20.

The drop in demand for mechanical load output may cause complete closing or shutting of the second valve 19 of the noncondensing turbine 11. If under such condition a further drop in demand for mechanical load output takes place, the increased speed will effect further downward movement of the lever 33 causing further downward movement of the right-hand end of the floating lever 31 and as an intermediate point of the lever 31 is fixed during closing position of the valve 19, the left-hand end of the lever 31 is forced upward. This causes counterclockwise turning movement of the fulcrumed lever 26 about the fulcrum 30 taking the control away from the pressure governor, to the effect that the valve 18 is moved towards its closed position.

If the turbine speed drops due to an increase in demand for mechanical load output, the speed governor 32 causes opening of the valve 19. The valve 19 in its fully open position is not stopped by the casing or, from another viewpoint, no means are provided to stop the valve 19 from moving in opening direction beyond its fully open position. This is indicated in the present instance by an enlarged portion at the right-hand end of the valve chest 17. As the valve 19 may move in opening direction beyond its fully open position, it does not render the pressure governor inoperative in response to a further increase in demand for mechanical load output. Thus, the pressure governor is rendered inoperative only when the demand for mechanical load output drops further after the valve 19 for the condensing turbine is shut.

Having described the method of operation of our invention, together with the apparatus which we now consider to represent the best embodiment thereof, we desire to have it understood that the apparatus shown is only illustrative and that the invention may be carried out by other means.

What we claim as new and desire to secure by Letters Patent of the United States is:

1. A parallel flow turbine arrangement including the combination of a noncondensing turbine and a condensing turbine for furnishing a common mechanical load output, valve means for controlling the flow of elastic fluid to the condensing turbine, another valve means for controlling the flow of elastic fluid to the noncondensing turbine, and a control mechanism comprising means for positioning both valve means in response to changes in condition of the elastic fluid discharged from the noncondensing turbine and other means for positioning the other valve means in response to changes in demand for mechanical load output without affecting the condition of the elastic fluid discharged from the noncondensing turbine.

2. A parallel flow turbine arrangement including the combination of a condensing turbine and a noncondensing turbine having a common shaft, a valve for each turbine for controlling the flow of elastic fluid thereto, means for positioning both valves in response to changes of a condition of the elastic fluid exhausted from the noncondensing turbine and to maintain constant the mechanical load output, and means to position the valve for the condensing turbine in response to changes in mechanical load output without affecting the condition of the elastic fluid discharged from the noncondensing turbine, said last-named means rendering the first-named means inoperative in response to a certain position of the valve for the condensing turbine.

3. A parallel flow turbine arrangement including the combination of a noncondensing turbine and a condensing turbine provided on the same shaft and provided with a common casing, means including a valve chest for conducting elastic fluid to each turbine, a first valve for controlling the flow of elastic fluid to the noncondensing turbine, a second valve for controlling the flow of elastic fluid to the condensing turbine, and a mechanism for controlling the valves comprising a first lever connected to the first valve, a second lever connected to the second valve and pivotally connected to the first lever, means including a pressure responsive device for moving the first lever in response to pressure changes in the exhaust of the noncondensing turbine, and speed responsive means connected to the second lever, said speed responsive means rendering the pressure responsive device inoperative as the demand for mechanical load output drops below a certain value.

FRANKLIN R. ERICSON.
ARTHUR D. SOMES.

CERTIFICATE OF CORRECTION.

January 12, 1937.

Patent No. 2,067,834.

FRANKLIN R. ERICKSON, ET AL.

It is hereby certified that error appears in the printed specification of the above numbered patent requiring correction as follows: Page 2, second column, line 16, for the word "condensing" read noncondensing; and that the said Letters Patent should be read with this correction therein that the same may conform to the record of the case in the Patent Office.

Signed and sealed this 9th day of March, A. D. 1937.

Henry Van Arsdale
Acting Commissioner of Patents.

(Seal)